United States Patent [19]

Matheson et al.

[11] Patent Number: 4,669,192

[45] Date of Patent: Jun. 2, 1987

[54] VARIABLE COMPLIANCE DEVICE

[75] Inventors: Ronald R. Matheson, Utica; Daniel E. Hucul, Bloomfield Hills; James Burkhardt, Plymouth; Joseph W. Schepke, Utica, all of Mich.

[73] Assignee: Auto/Con Corp., Mt. Clemens, Mich.

[21] Appl. No.: 832,377

[22] Filed: Feb. 24, 1986

[51] Int. Cl.⁴ .............................................. G01B 7/31
[52] U.S. Cl. ..................................... 33/169 C; 33/626
[58] Field of Search ............ 33/169 C, 169 R, 180 R, 33/172 D, 185 R

[56] References Cited

U.S. PATENT DOCUMENTS

| | | | |
|---|---|---|---|
| 4,098,001 | 7/1978 | Watson | 33/169 C |
| 4,155,169 | 5/1979 | Drake et al. | 33/169 C |
| 4,276,697 | 7/1981 | Drake et al. | 33/169 C |
| 4,379,363 | 4/1983 | Whitney | 33/169 C |
| 4,485,562 | 12/1984 | DeFazio | 33/185 R |
| 4,543,726 | 10/1985 | Lauer et al. | 33/169 C |
| 4,571,148 | 2/1986 | Drazan | 33/185 R |

OTHER PUBLICATIONS

Technical Paper MS79-873, "Using Compliance in Assembly—An Engineering Approach to Float", by S. H. Drake et al.—The Computer and Automated Systems Assoc. of SME, 1979, pp. 1-12.
Brochure: "Model AST-100 Accommodator": Barry Wright Corp., 2 pages.
Brochure: "Model ASP-85 Accommodator": Barry Wright Corp., 2 pages.
Brochure: "Model AST-75 Accommodator": Barry Wright Corp., 2 pages.
Brochure: "Series GTP-45 Gripper": Barry Wright Corp., 1 page.

*Primary Examiner*—Willis Little
*Attorney, Agent, or Firm*—Harness, Dickey & Pierce

[57] ABSTRACT

A variable compliance assembly is disclosed for use in automatic assembly operations. The variable compliance assembly includes a housing having an interior chamber; a base member, positioned on the surface of the interior chamber, moveable in a multi-directional fashion; a fluid spring operably associated with the housing and base member for controlling the multi-directional movement of the base member and for returning the base member to a normal, self-centering seating position; and a mechanism for associating a pressurized fluid source with the fluid spring to vary the amount of control exerted by the fluid spring on the base member.

20 Claims, 4 Drawing Figures

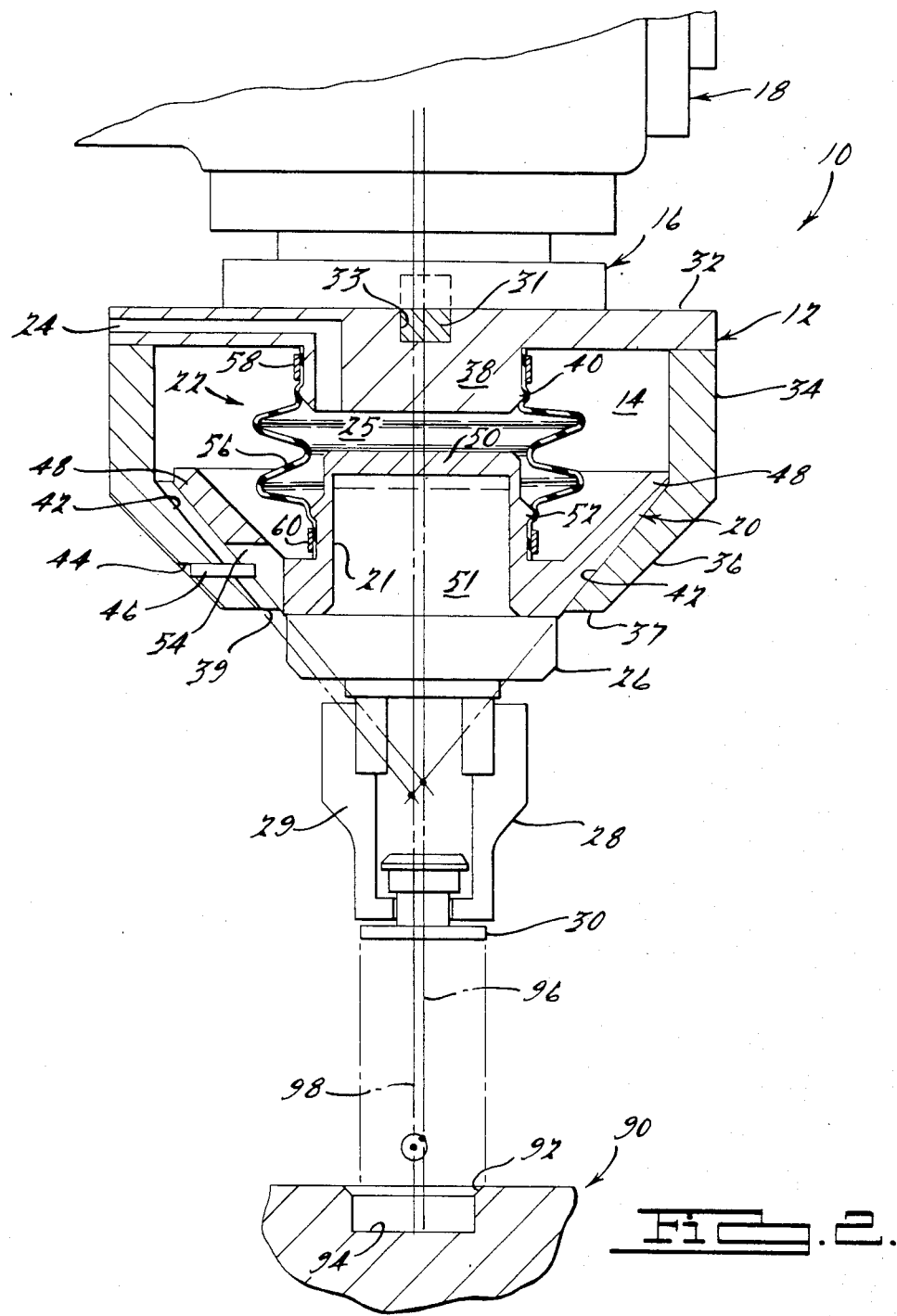

VARIABLE COMPLIANCE DEVICE

BACKGROUND AND SUMMARY OF THE INVENTION

The present invention relates to variable compliance assemblies and more particularly to a variable compliance assembly for an automatic assembly operation utilizing a fluid spring for providing multi-directional compliance movement of a gripper member or similar device.

The uses of robots in the assembly of close-fitting mechanical parts has become widespread. The assembly of close-fitting mechanical parts, however, usually has predetermined tolerances between the workpiece and the receiving part. Compliance assemblies enable a workpiece to be inserted into a receiving part when the centerlines of the workpiece and the receiving part are not exactly collinear with one another to minimize assembly forces and the possibility of jamming or destruction of parts due to machining inaccuracy, parts variation, and fixturing tolerances.

Several compliance assemblies have attempted to resolve variation in centerlines between a workpiece and a receiving part. U.S. Pat. No. 4,276,697 (Drake and Simunovic) discloses a compliance assembly utilizing a multi-stranded cable having an elastomeric collar for providing compliance movement in the assembly. U.S. Pat. No. 4,155,169 (Drake and Simunovic) discloses a compliance assembly utilizing deformable members for providing compliance movement in the assembly. U.S. Pat. No. 4,098,001 (Watson) discloses a compliance assembly utilizing deflectable members for providing compliance movement in the assembly. Also, a technical paper entitled "Using Compliance In Assembly—An Engineering Approach To Float", CASA MS79-873, by Drake, Spencer, and Simunovic discloses compliance assemblies utilizing springs and elastomeric shear pads for providing compliance movement in the assembly.

The above-described assemblies, however, have several disadvantages. Springs, cables, deformable members, and deflectable members are subject to fatigue failure. The failure of these elements in turn causes the automatic assembly operation to be stopped for a repair period which, in turn, stops production. The above assemblies are also highly complicated, include several moving parts, and involve precision tooling in the manufacturing of the assemblies. The resilient elements are assembled on the compliance assemblies at very precise angles, making the compliance assemblies complicated and costly to manufacture.

The present invention overcomes the disadvantages of the prior art by providing a relatively simple and relatively inexpensive variable compliance assembly. The new and improved variable compliance device of the present invention includes a housing having an interior chamber and a base member positioned in the housing and seated on a surface of the interior chamber. Generally, the base member is secured to a gripper and provides the gripper with multi-directional compliance movement. The variable compliance assembly further comprises a fluid spring associated with the housing and the base member for providing the base member with multi-directional compliant movement to correct for lateral, out-of-square, or other misalignment, and for returning the base member to a normal, self-centering seating position. A passageway in the housing is also disclosed for transfer of pressurized fluid to and from the interior of the fluid spring to enable the fluid spring to have varying degrees of pressure and compliance.

Other objects and advantages of the present invention will become apparent to one skilled in the art in view of the following specification, accompanying drawing, and appended claims.

BRIEF DESCRIPTION OF THE DRAWINGS

FIG. 2 is the view of FIG. 1 with the variable compliance assembly in a displaced position;

DETAILED DESCRIPTION OF THE PREFERRED EMBODIMENTS

Figure 1:
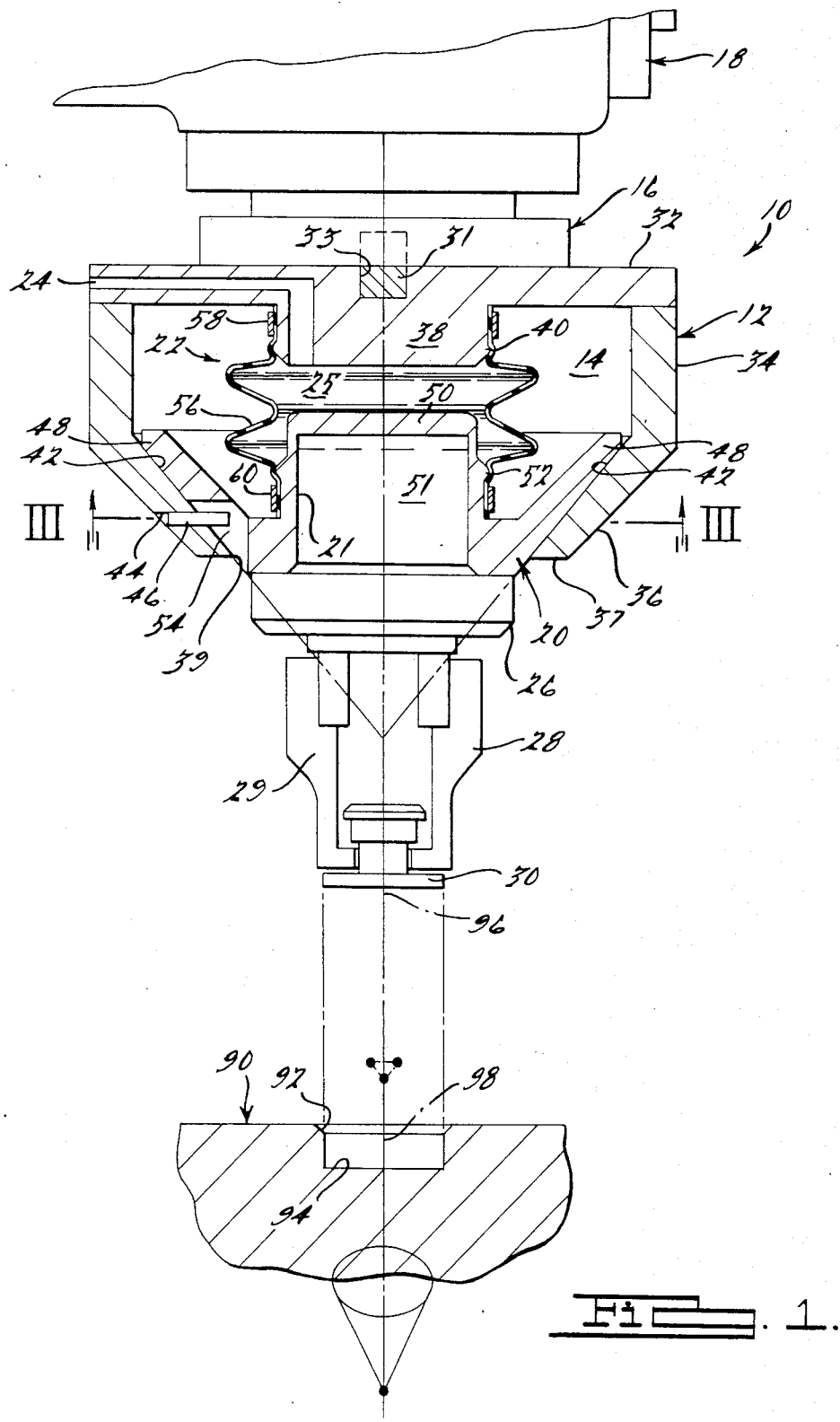
FIG. 1 is a cross-sectional view of a variable compliance assembly in accordance with the present invention.

Referring to FIGS. 1 and 2, a cross-sectional view of a variable compliance assembly is shown and designated by reference numeral 10. The compliance assembly 10 includes a housing 12, having an interior chamber 14, positioned on a wrist 16 of a robot arm 18. A base member 20 is positioned in the interior chamber 14 of the housing 12. A fluid spring 22 is secured to the housing 12 and base member 20 for providing the base member 20 with multi-directional compliance movement in the housing 12 and for returning the base member 20 to a normal resting position.

The normal resting position of the base member 20 is illustrated in FIG. 1. A passage 24 in the housing 12 enables a pressurized fluid source 13 (FIG. 4) to communicate with the interior chamber 25 of the fluid spring 22. Generally a gripper device 26 having gripper fingers 28 and 29 is secured onto the base member 20 by conventional means into recess 21 of the base member 20. The gripper fingers 28 and 29 are operatively associated with the gripper device 26 for grasp, release, insertion, and transport of the workpiece 30.

The housing 12 includes a top wall 32, which is securely fastened to the wrist 16 by conventional means such as a bolt 31 extending from the wrist 16 and threadably inserted into an aperture 33 in the wall 32. The housing 12 further includes an annular sidewall 34 depending substantially perpendicular from the periphery of the top wall 32 and an annular flange 36 depending angularly from and continuous with the sidewall 34. The top wall 32, sidewall 34, and flange 36 define the outer boundary of the interior chamber 14.

The top wall 32 has a projection 38 to secure the fluid spring 22 to that wall 32. The projection 38 has a peripheral flange 40 which retains the upper portion of the spring 22 as noted below. The top wall 32 also contains the passage 24 bored through the top wall 32 and the projection 38 to communicate a pressurized fluid source 13 (above atmosphere) with the interior 25 of the fluid spring 22.

Figure 3:
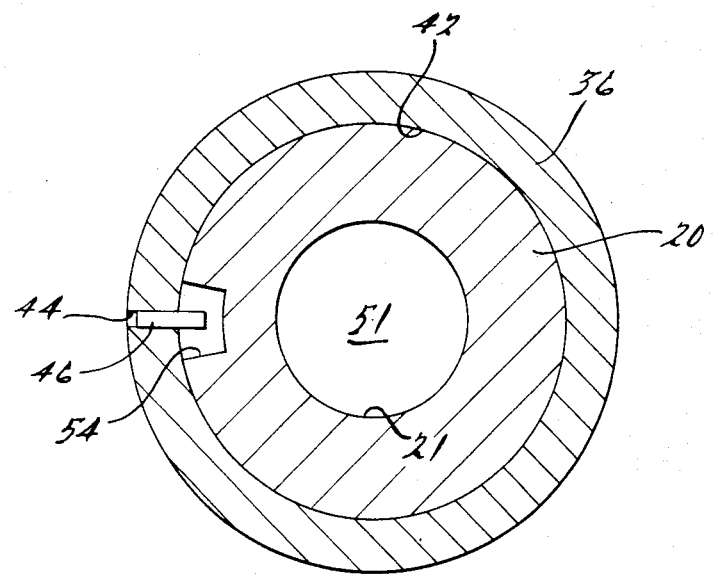
FIG. 3 is a cross-sectional view of FIG. 1 taken along lines 3—3.

The free depending end 37 of the flange 36 defines a circular opening 39 which enables the base member 20 to project outwardly from the housing 12. The interior surface of the flange 36 forms a frustoconical seating surface 42 for the base member 20. An aperture 44 is formed in the flange 36 to hold a pin 46 in the housing 12. The pin 46 controls rotational movement of the base member 20 relative to rotational movement of the housing 12. The base member 20 has a notch 54, best seen in FIG. 3, for enabling the housing pin 46 to insert into the base member 20 for limiting independent rotation of the base member 20. As the base member 20 rotates in the housing 12, the walls of the notch 54 abut against pin 46 limiting the rotation of the base member 20 with respect to the housing 12. Thus, the notch 54 may provide the base member 20 with a limited degree of independent rotation inside of the housing 12 if rotation is not a factor. If rotational alignment must also be taken into consideration, such as with a square part, the notch 54 would conform to the pin to permit no relative rotation between the housing 12 and the base member 20.

The base member 20, projecting through the housing opening 39, has an overall frustoconical shape including an angular sidewall 48 which matingly seats on the interior surface 42 of the housing flange 36 and a projection 50. This angular arrangement enables the base member 20 to have free sliding movement upon the interior surface 42 of the housing flange 36. The projection 50 provides the base member 20 with a surface for securing the fluid spring 22 onto the base member 20 and has a peripheral flange 52 to retain the lower portion of the spring 22 as will be noted below. Generally, the projecting member 50 is of a cylindrical shape.

The fluid spring 22 is comprised in the described embodiment of a resilient bellows 56. The bellows 56 may be manufactured from any resilient material, preferably an elastomeric material. The bellows 56 is secured to the projections 38 and 50 of the housing top wall 32 and base member 20, respectively, by rings 58 and 60 acting against the flanges 40 and 52 of the projections 38 and 50, respectively to secure the upper portion of the bellows 56 to the housing 12 and the lower portion of the bellows 56 to the base member 20.

Figure 4:
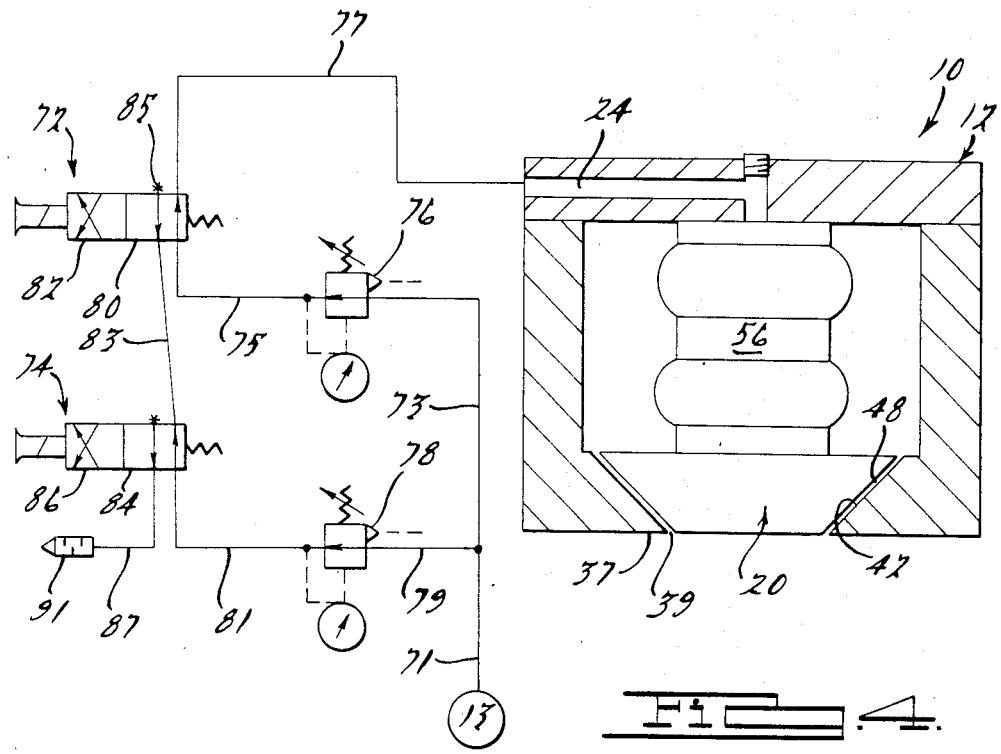
FIG. 4 is a schematic view of a control system for the present invention.

The interior of the bellows 56 may communicate with the pressurized fluid source 13 via passage 24 and a control system 70. Referring to FIG. 4, a schematic view of a control system 70 is illustrated for pressurization of the bellows 56 of the fluid spring 22. The bellows 56 should be pressurized at a higher pressure, providing a stiffer, more expanded bellows 56, as shown in FIG. 4, when the robot arm 16 transfers a workpiece 30 from station to station. The stiffer bellows 56 enables the base member 20 to be rigidly secured in the housing 12, reducing compliant movement of the base member 20 during the transfer period during which the assembly 10 is moved over a relatively large distance at a relatively rapid rate than compared to when the assembly is used at a work station, where the bellows 56 should be in a low pressure state at the robot arm 16 inserts, grasps, or releases a workpiece 30. In the low pressure state, as shown in FIGS. 1 and 2, the bellows 56 provides the base member 20 with multi-directional compliance movement within the housing 12. The amount of compliance can be varied as desired with variance in the pressure of the fluid passing to or released from the bellows 56.

The control circuit 70 includes first and second solenoid control valves 72 and 74 and high pressure and low pressure relief valves 76 and 78. The first solenoid valve 72 has a first position 80 for enabling high pressure fluid (approximately 5 psi in the described embodiment) to enter into the bellows 56 to expand the bellows 56 and provide the base member 20 with a rigid, less compliant position, as seen in FIG. 4. In this position, the source 13 communicates via conduits 71 and 73 with the high pressure relief valve 76 which in turn communicates via conduit 75 with the first solenoid valve 72, which, in first position 80, communicates with passageway 24 via conduit 77. Low pressure fluid is blocked off by a plug 85 associated with the first solenoid valve 72.

The first solenoid valve 72 has a second position 82 for enabling low pressure fluid (approximately 2 psi in the described embodiment) to enter the bellows 56 and provide the bellows 56 with a low pressure, more compliant, limp position as seen in FIGS. 1 and 2.

Low pressure fluid enters into the bellows 56 when the first solenoid valve 72 is actuated to its second position 80 and the second solenoid valve 74 is disposed in its first position 84. In this position, the source 13 communicates via conduits 71 and 79 with the lower pressure relief valve 78 which in turn communicates via conduit 81 with the second solenoid valve 74. A conduit 83 also extends from the second valve 74 to the first valve 72 which communicates with conduit 77 and passage 24 when the solenoid 72 is in its second position 82. High pressure fluid is blocked off by the plug 85 associated with the solenoid valve 72.

The bellows 56 can be evacuated to the atmosphere when the first solenoid valve 72 is in its second position 82 and the second solenoid valve 74 is in its second position 86. This evacuation position provides the bellows 56 with a means for rapid evacuation of the bellows 56 so that the pressure inside of the bellows 56 may be changed rapidly from high pressure to low pressure for accommodating the bellows 56 in its expanded and limp positions, respectively. In this position, the source 13 is blocked off and the bellows 56 via conduits 24 and 77 communicates with conduit 83 via valve 72 and conduit 87 via valve 74. Conduit 87 is vented to the atmosphere at port 91. Port 91 may also be connected as a third source of pressurized air.

The check valves 76 and 78 prevent the high and low pressure fluids from exceeding their predetermined levels. If the pressure of the fluid exceeds the predetermined level, the relief valves 76 and 78 automatically release the fluid entering the system to maintain the desired pressure.

Now referring back to FIGS. 1 and 2, a receiving part 90 is shown. The receiving part 90 has a chamfer 92 and a receiving portion 94 for receiving the workpiece 30. In FIG. 1, the line 96 associated with the center of the workpiece 30 is collinear with the line 98 associated with the center of the receiving part 90. In this case, the workpiece 30 should insert into the receiving part 90 with no apparent compliance problem, although the cone of compliant movement of the center of compliance of a workpiece is shown in dashed lines in FIG. 1. The center of compliance of a workpiece is known in the art as the point on a workpiece where a lateral force causes only a lateral deflection and a torque or moment causes only a rotational deflection.

Turning to FIG. 2, illustrating when the lines 96 and 98 associated with the centers of the workpiece 30 and receiving part 90, respectfully, are not collinear. When this is the case, a compliance problem exists which the compliance assembly 10 corrects.

Generally, in the compliance process the workpiece 30 comes into contact with the chamfer 92 of the receiving part 90. The robot arm 16 forces the workpiece 30 toward the receiving part to insert the workpiece 30 into the receiving portion 94 of the receiving part 90. At this time, the bellows 56 (in a limp state) and the base member 20 (seated on the flange interior surface 42)

move to insert the workpiece 30 into the receiving part 90. The movement of the base member 20 occurs by the base member sidewall 48 sliding upon the flange interior surface 42 until proper compliance is achieved and the workpiece 30 is inserted into the receiving part 90.

The conical shape of the base member 20 and interior surface 42 of the flange 36 provides the compliance assembly 10 with multi-directional compliant movement so that a lack of collinear alignment in any direction between the workpiece 30 and the receiving part 90 may be corrected. In addition, the fluid spring 22 may provide the compliance assembly 10 with some limited axial movement, if desired. Once the workpiece 30 has been deposited in the receiving part 90 and the gripper fingers 28 and 29 release the workpiece 30, the bellows 56 will return and self-center the base member 20 to its normal seating position.

Generally, pressurized air (above atmosphere) is used as the working fluid since pressurized air can be rapidly moved in and out of the interior of the bellows 56. However, hydraulic fluid could be used as the working fluid with satisfactory results where weight and speed are less important considerations.

While the above summarizes the present invention, it will become apparent to those skilled in the art that modifications, variations and alterations may be made without deviating from the scope and spirit of the present invention as described and claimed herein.

We claim:

1. A variable compliance assembly comprising:
   a housing,
   a base member positioned in said housing, said base member having movement relative to said housing,
   a fluid spring associated with said housing and with said base member for controlling the movement of said base member and biasing said base member to a seating position, and
   means associated with said housing for providing fluid to said fluid spring.

2. A variable compliance assembly according to claim 1, wherein said housing includes a top wall, a sidewall, and a depending flange.

3. A variable compliance assembly according to claim 2, wherein a chamber is defined in said housing by said top wall, sidewall, and flange.

4. A variable compliance assembly according to claim 3, wherein said depending flange forms a frustoconical surface in said chamber.

5. A variable compliance assembly according to claim 4, wherein said base member includes a frustoconical sidewall which seats on said frustoconical surface in said housing chamber.

6. A variable compliance assembly according to claim 1, wherein gripper means is secured to said base member.

7. A variable compliance assembly according to claim 1, wherein said fluid spring comprises bellows means securely fastened to said base member and to said housing and operably associated with said fluid means.

8. A variable compliance assembly according to claim 7, wherein pressurized air is the working fluid in said fluid spring.

9. A variable compliance assembly according to claim 1, wherein said fluid providing means includes a port in said housing communicating with the interior of said fluid spring.

10. A variable compliance assembly comprising:
    a housing including a top wall secured to a moveable member, a sidewall depending from said top wall, an annular flange angularly depending from said sidewall, said flange having a free depending end defining a circular opening in said housing, wherein said top wall, sidewall, and flange define an interior chamber in said housing having an interior seating surface;
    base member means seated on the interior surface of said depending flange in said interior chamber and having multi-directional movement on said interior seating surface;
    fluid spring means operably associated with said base member means and said housing for controlling the multi-directional movement of said base member means; and
    means associated with said housing and with the interior of said fluid spring means for providing and removing a working fluid into said fluid spring means.

11. A variable compliance assembly according to claim 10, wherein said interior surface of said flange forms a frustoconical surface in said interior chamber.

12. A variable compliance assembly according to claim 11, wherein said base member means includes a frustoconical sidewall seated on said frustoconical surface of said flange.

13. A variable compliance assembly according to claim 10, wherein said fluid spring means comprises a bellows secured to said top wall and base member.

14. A variable compliance assembly according to claim 13, wherein said means for providing and removing fluid from said fluid spring means includes a passageway in said housing top wall communicating with the interior of said bellows.

15. A variable compliance assembly according to claim 14, wherein gripper means is secured to said base member means.

16. A variable compliance assembly according to claim 14, wherein said fluid is air pressurized above atmospheric pressure.

17. A compliance assembly for an automatic assembly operation having a first workpiece associated with a second workpiece, comprising means for mounting said assembly to a working device, means for gripping a workpiece, means for moving said gripping means relative to said mounting means in response to forces created by the interface of said first workpiece with said second workpiece, fluid spring means for controlling said movement of said gripping means and for self-centering said gripping means relative to said mounting means, and means for varying the amount of control said fluid spring means exerts on said movement of said gripping means.

18. A compliance device for an automatic assembly operator comprising fluid spring means for complying the position of a workpiece held by said device with a second desired position misaligned from said first position and means for controlling the amount of compliance rendered by said complying means, including means for varying said amount of compliance by providing or removing a working fluid into said fluid spring means.

19. A device in accordance with claim 18, wherein said compliance can be varied without release of said workpiece from said device.

20. A device in accordance with claim 18, wherein said controlling means is disposed remotely from said means for complying and said device further includes means for operably associating said controlling means with said complying means.

* * * * *